(12) United States Patent
Zhang et al.

(10) Patent No.: US 10,838,986 B2
(45) Date of Patent: Nov. 17, 2020

(54) METHOD AND SYSTEM FOR CLASSIFYING VEHICLE BASED ROAD SIGN OBSERVATIONS

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 283 days.

(21) Appl. No.: 16/034,222

(22) Filed: Jul. 12, 2018

(65) Prior Publication Data
US 2020/0019639 A1 Jan. 16, 2020

(51) Int. Cl.
| | |
|---|---|
| G06F 16/28 | (2019.01) |
| G06F 16/29 | (2019.01) |
| G06F 16/14 | (2019.01) |
| G06F 16/16 | (2019.01) |
| G06F 16/23 | (2019.01) |
| G06F 16/9537 | (2019.01) |
| G01C 21/26 | (2006.01) |

(52) U.S. Cl.
CPC .......... *G06F 16/285* (2019.01); *G01C 21/26* (2013.01); *G06F 16/148* (2019.01); *G06F 16/162* (2019.01); *G06F 16/2379* (2019.01); *G06F 16/29* (2019.01); *G06F 16/9537* (2019.01)

(58) Field of Classification Search
CPC ...... G06F 16/285; G06F 16/29; G06F 16/148; G06F 16/162; G06F 16/2379; G06F 16/9537; G01C 21/26
See application file for complete search history.

(56) References Cited

U.S. PATENT DOCUMENTS

| | | | |
|---|---|---|---|
| 6,850,841 B1 * | 2/2005 | Casino | G01C 21/26 340/995.1 |
| 8,531,318 B2 * | 9/2013 | Denaro | B60R 22/48 340/995.27 |
| 9,222,786 B2 * | 12/2015 | Witmer | G01C 21/32 |

(Continued)

FOREIGN PATENT DOCUMENTS

| | | |
|---|---|---|
| EP | 2048597 A1 | 4/2009 |
| JP | 2012164254 A | 8/2012 |

OTHER PUBLICATIONS

Garrido et al., "Complete Vision-based Traffic Sign Recognition Supported by an I2V Communication System", article, Sensors 2012, 12, published Jan. 30, 2012, retrieved from www.mdpi.com/1424-8220/12/2/1148/pdf, pp. 1148-1169.

*Primary Examiner* — Frederick M Brushaber
(74) *Attorney, Agent, or Firm* — Ditthavong & Steiner, P.C.

(57) ABSTRACT

A method, system, and computer program product is provided, for example, for filtering road signs. The method comprises receiving a road sign observation information from a vehicle on a link. The road sign information includes at least a location of the vehicle. The method further comprises retrieving a sign file information from a database. The sign file information includes location of a plurality of VSS gantries in a geographical region. The method further includes filtering the road sign observation information if the location of the vehicle is within a predetermined distance threshold from at least one VSS gantry from the plurality of VSS gantries in the geographical region.

20 Claims, 7 Drawing Sheets

(56) References Cited

U.S. PATENT DOCUMENTS

| | | | |
|---|---|---|---|
| 9,459,626 B2 | 10/2016 | Chen et al. | |
| 9,506,763 B2 * | 11/2016 | Averbuch | B60W 50/14 |
| 10,359,290 B2 * | 7/2019 | Felix | G01C 21/32 |
| 10,359,781 B2 * | 7/2019 | Denaro | G01C 21/3697 |
| 10,430,695 B2 * | 10/2019 | Sathyanarayana | G06N 3/084 |
| 2004/0010352 A1 * | 1/2004 | Stromme | G08G 1/096758 |
| | | | 701/1 |
| 2008/0065427 A1 * | 3/2008 | Helitzer | G06F 19/00 |
| | | | 705/4 |
| 2018/0365533 A1 * | 12/2018 | Sathyanarayana | G06K 9/6267 |
| 2019/0005812 A1 * | 1/2019 | Matus | H04W 4/027 |
| 2019/0205674 A1 * | 7/2019 | Silver | G05D 1/0223 |
| 2019/0286924 A1 * | 9/2019 | Fujita | G08G 1/16 |
| 2019/0286948 A1 * | 9/2019 | Sathyanarayana | G06N 20/00 |
| 2020/0018604 A1 * | 1/2020 | Zhang | G06K 9/00476 |
| 2020/0020230 A1 * | 1/2020 | Zhang | G01C 21/3626 |
| 2020/0042806 A1 * | 2/2020 | Zhang | G05D 1/0221 |
| 2020/0050973 A1 * | 2/2020 | Stenneth | G06N 20/00 |

* cited by examiner

| | |
|---|---|
| LatT, LonT | TSR LATITUDE AND LONGITUDE |
| HT | TSR HEADING |
| LatG, LonG | GANTRY LATITUDE AND LONGITUDE |
| O | ORIGINAL LINK PVID FOR GANTRY |
| D | DESTINATION LINK PVID FOR GANTRY |
| F | FUNCTION CLASS FOR GANTRY |
| G | NOTATION FOR GANTRY |
| $T_i$ | NOTATION FOR THE ITH TSR |

FIG. 4

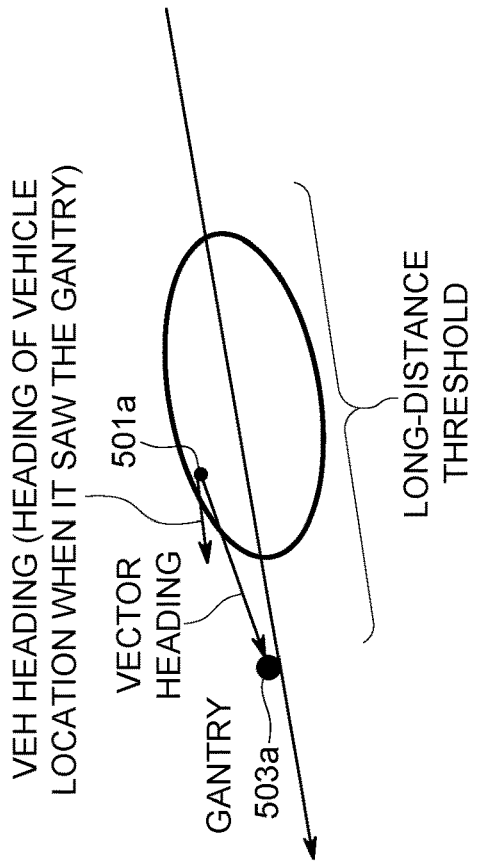
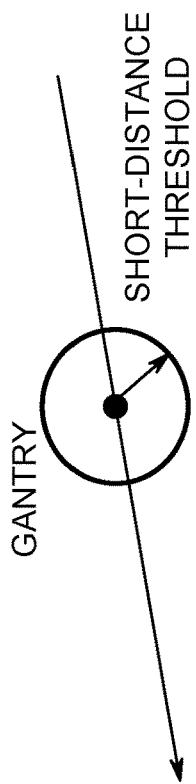
FIG. 5A
FIG. 5B

METHOD AND SYSTEM FOR CLASSIFYING VEHICLE BASED ROAD SIGN OBSERVATIONS

TECHNOLOGICAL FIELD

The present disclosure generally relates to a system and method for providing assistance to a driver of a vehicle or the vehicle itself, and more particularly relates to a system and method for using a map database for classifying traffic signs related information for vehicles on a link.

BACKGROUND

Map based applications are used in many navigation applications in vehicles. The map can be used as a source of speed limit information, road sign information, variable speed sign (VSS) related information, and direction related information for traffic signs, such as speed signs posted on gantries and the like. The navigation applications rely on map data for performing various navigation assisted functions. Thus, the map database should be provided with accurate and up-to-date data.

The map database may receive data related to road signs, which can be static signs or VSSs posted on gantries, via ingestion of vehicle smart sensor data (sensor data) and analysis, coding and distribution of relevant information derived from the sensor data and conflated with other sources. Thus, using data from vehicle sensors, the map database can be updated daily. The map database may also be used to provide an interface for assisting a driver in navigation related functions, such that the interface can display various speed limits derived from map database data, based on road sign data received from a number of vehicles. At times, the vehicles may classify a variable speed sign data erroneously as a static sign data. This may lead to errors in providing navigation assistance related information to the driver of a vehicle, specifically in prescribing a speed limit for driving.

BRIEF SUMMARY

In light of the above-discussed problems, there is a need for more accurate measures for classifying data from road signs, specifically speed related road signs.

Further, there is a need to provide more accurate classification of road signs, such as static signs and VSSs for providing better visualization of speed limit data on a map interface of a navigation device.

The major problem affecting accuracy of road sign data is that reporting vehicles can observe speed values that are displayed on variable speed sign (VSS) gantries and report them as static speed limits. This in turn may lead to fluctuations in the learned speed value on a link, though the road sign may actually be a static speed sign. Thus, the vehicles should clearly distinguish between a VSS observations and a static sign observation. The map database may include a "road sign permanency flag" which may be used to provide the status or type of a road sign. The problem discussed above arises when a VSS is misclassified as a static sign by the vehicle, and the misclassification causes road sign permanency flag to be set as static.

The methods and systems disclosed herein address this issue of detecting and suppressing these VSS observations using a map and sensor data. In an example embodiment, a method to filter a road sign observation in a database is provided. The method comprises receiving the road sign observation information from a vehicle on a link, wherein the road sign information includes at least a location of the vehicle. The method further includes retrieving, from the database, a sign file information wherein the sign file information includes location of a plurality of VSS gantries in a geographical region. Additionally, the method comprises filtering the road sign observation information if the location of the vehicle is within a predetermined distance threshold from at least one VSS gantry from the plurality of VSS gantries in the geographical region.

In some example embodiments, a mapping platform may be provided. The mapping platform may include at least one processor and at least one memory including computer program code for one or more programs. The at least one memory and the computer program code configured to, with the at least one processor, cause the mapping platform to perform at least the following: receive a road sign observation information from a vehicle, wherein the road sign observation information includes a heading information of the vehicle. The mapping platform is further caused to receive a sign file information, wherein the sign file information is used to identify a heading information for a gantry. Additionally, the mapping platform is caused to identify a heading of sight from the vehicle to the gantry based on the heading information of the vehicle and the heading information of the gantry. Further, the mapping platform may be caused to identify a distance range for road sign observation information detection. Further, the mapping platform may be caused to calculate a difference between the heading information of the vehicle and the heading of sight from the vehicle to the gantry and filter the road sign observation information based on a first filtering criteria or a second filtering criteria, wherein the first filtering criteria includes at least that the distance range for road sign observation information detection is within a long distance threshold and the second filtering criteria includes at least that the distance range for road sign observation information detection is within a short-distance distance threshold.

In some example embodiments a computer program product is provided. The computer program product comprising at least one non-transitory computer-readable storage medium having computer-executable program code instructions stored therein, the computer-executable program code instructions comprising program code instructions for receiving a road sign observation information from a vehicle, wherein the road sign observation information includes a heading information of the vehicle. The computer program product further comprising program code instructions for receiving a sign file information, wherein the sign file information is used to identify a heading information for a gantry. The computer program product further comprising program code instructions for identifying a heading of sight from the vehicle to the gantry based on the heading information of the vehicle and the heading information of the gantry. The computer program product further comprising program code instructions for identifying a distance range for road sign observation information detection. The computer program product further comprising program code instructions for calculating a difference between the heading information of the vehicle and the heading of sight from the vehicle to the gantry and filtering the road sign observation information based on a first filtering criteria or a second filtering criteria. The first filtering criteria includes at least that the distance range for road sign observation information detection is within a long distance threshold and the second filtering criteria includes at least that the distance range for road sign observation information detection is within a short-distance distance threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
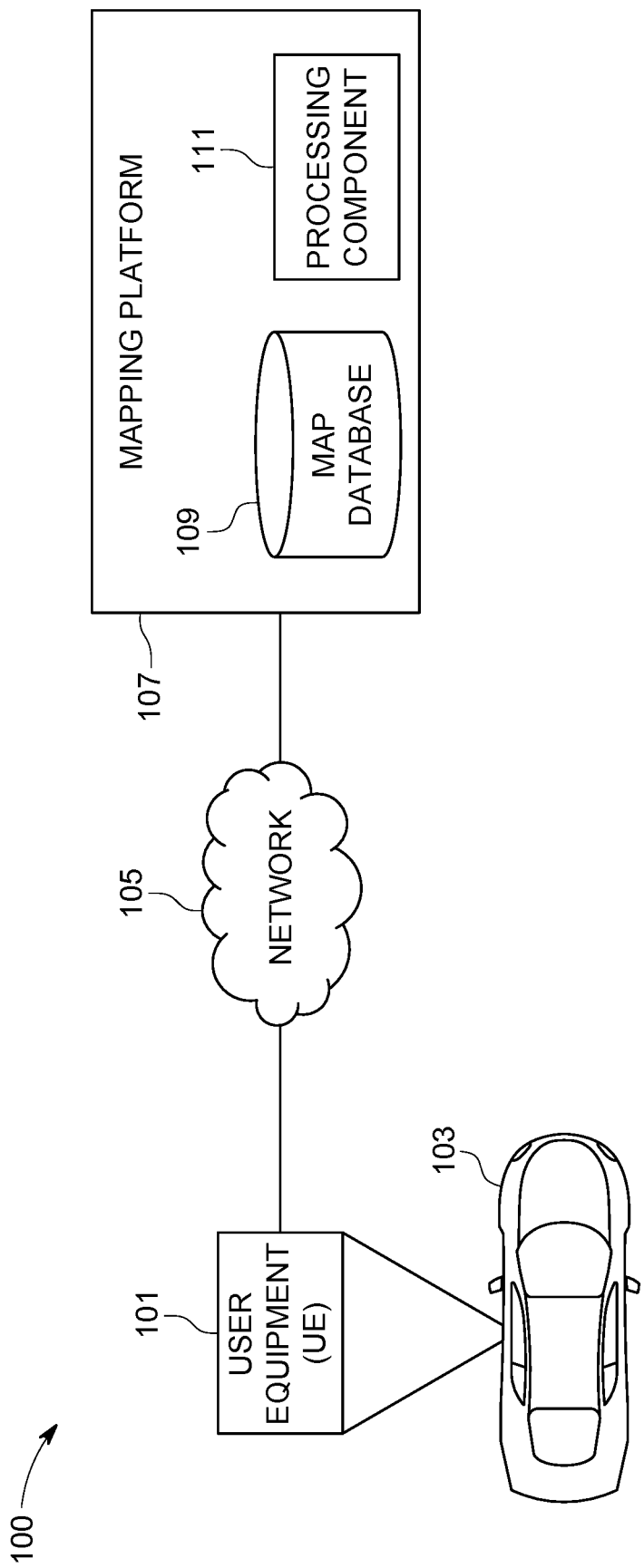
Figure 2:
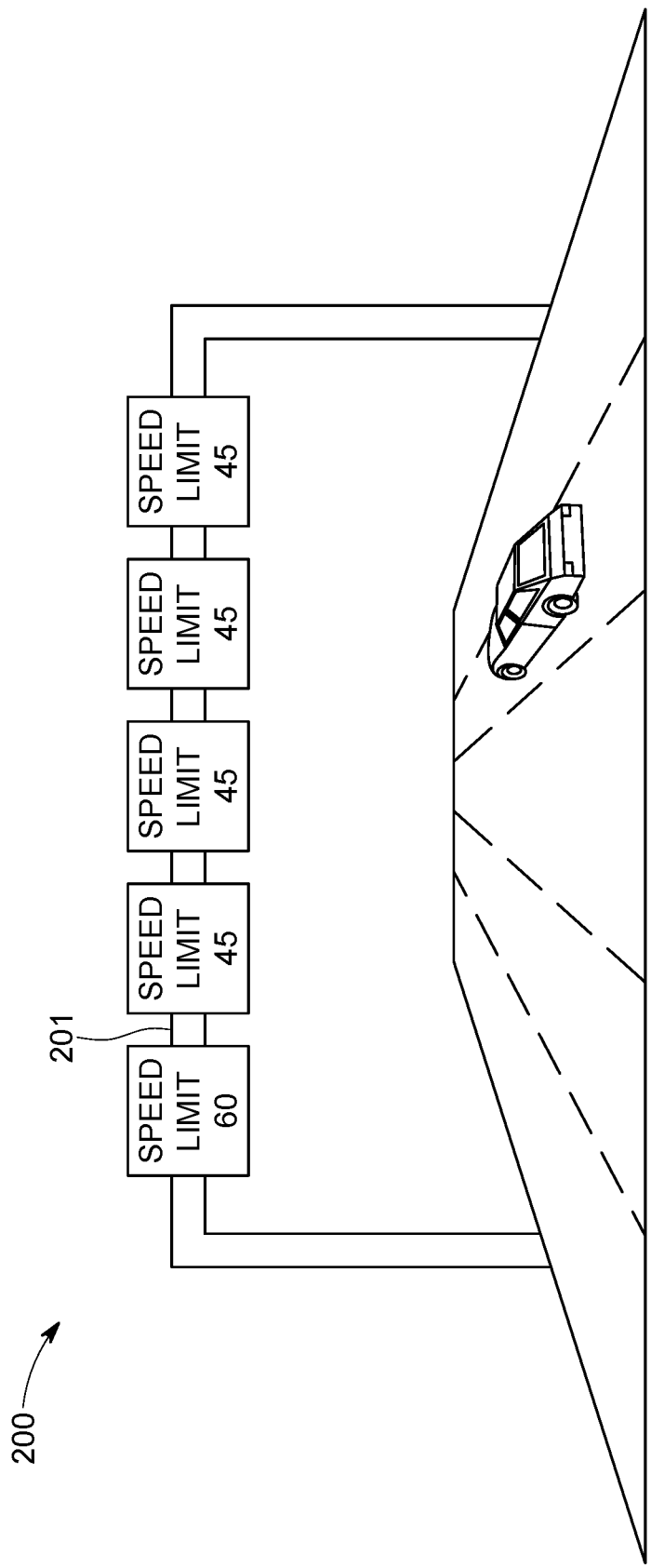
Figure 3:
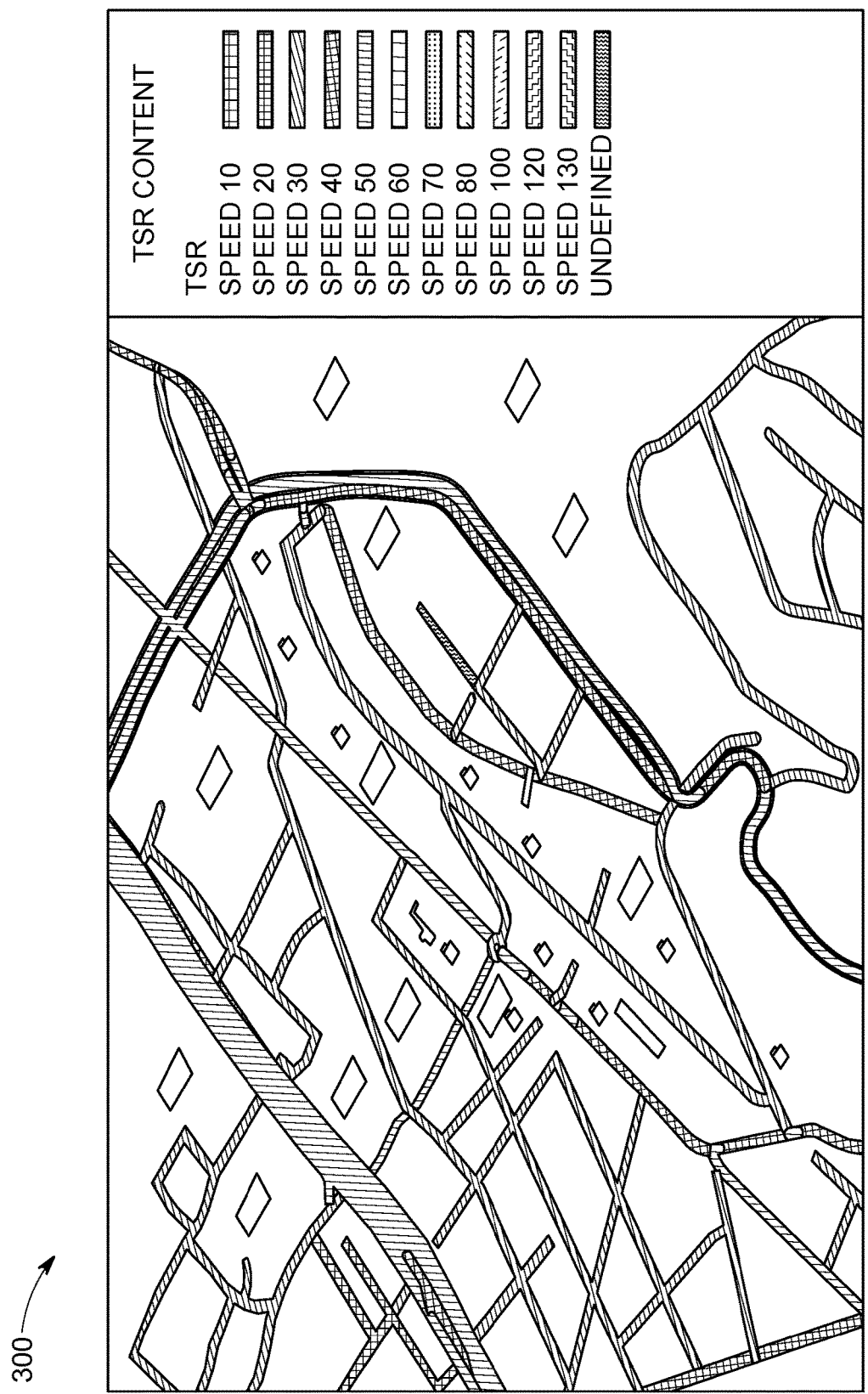
Figure 6:
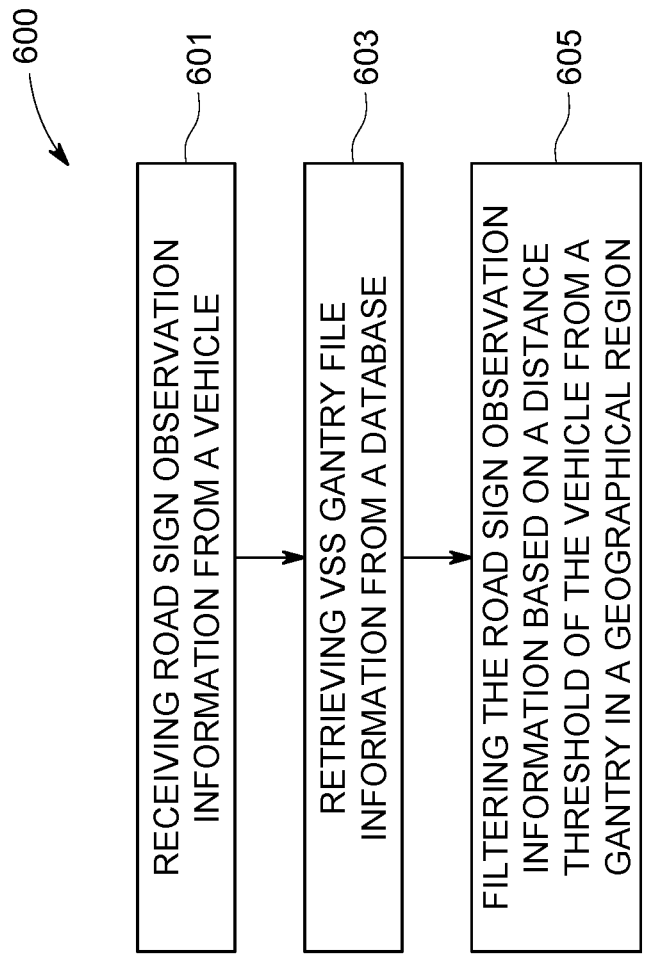
Figure 7:
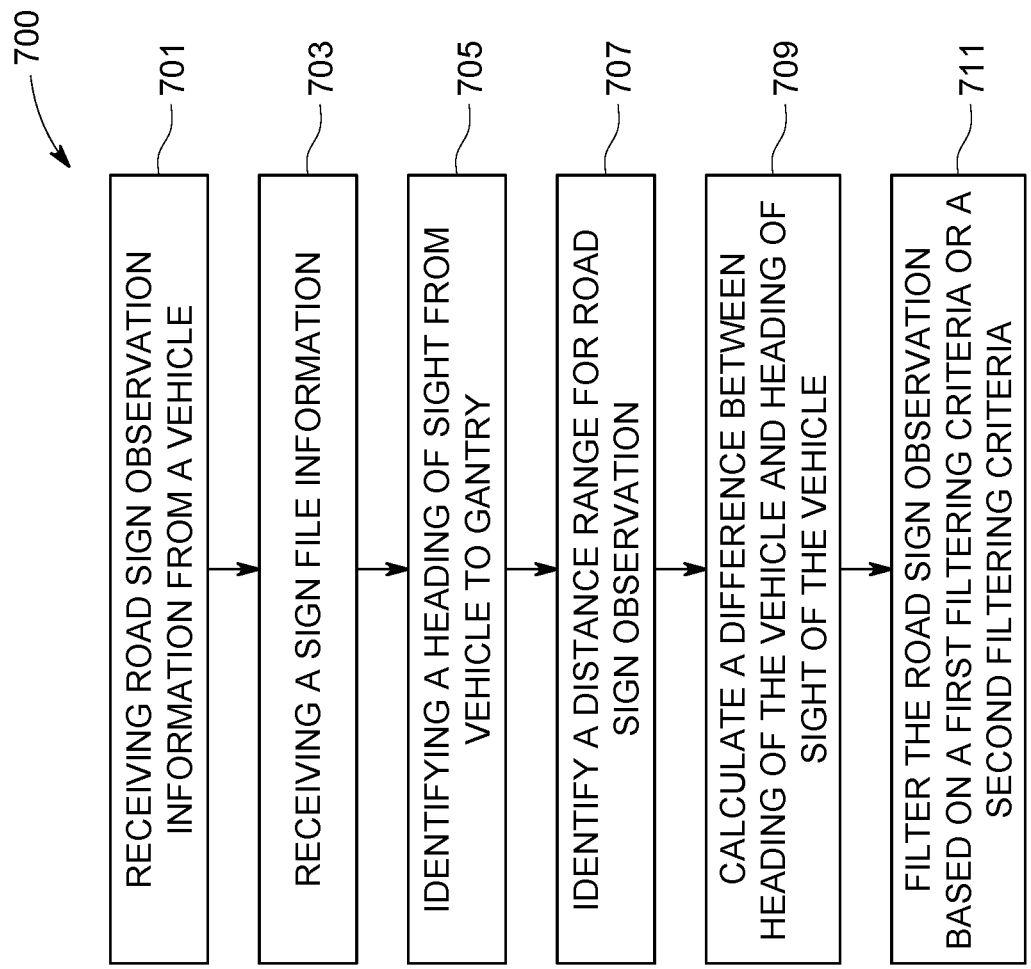

Having thus described example embodiments of the invention in general terms, reference will now be made to the accompanying drawings, which are not necessarily drawn to scale, and wherein:

FIG. 1 illustrates a block diagram of a system for providing classification of road sign information in accordance with an example embodiment;

FIG. 2 illustrates a diagram of a variable speed sign gantry in accordance with an example embodiment;

FIG. 3 illustrates an exemplary display interface of a navigation device for providing speed limit visualization according to an example embodiment;

FIG. 4 illustrates an exemplary record stored in a map database according to an example embodiment;

FIGS. 5A-5B illustrate exemplary diagrams illustrating distance ranges for classification of road signs according to an example embodiment;

FIG. 6 illustrates a flow diagram of a method for filtering of road signs according to an example embodiment;

FIG. 7 illustrates a flow diagram of another method for filtering of road signs according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention. A method, apparatus, and computer program product are provided herein in accordance with an example embodiment for providing heading related information for vehicles in general. The heading related information for vehicles is derived from a heading value of a gantry, which is calculated on the basis of limited amount of location coordinate information available in a map database. The heading related information and thus heading value of gantry may then be updated in the map database for use in navigation related applications using the map database. These navigation related applications may include such as route guidance, assisted driving functions, autonomous driving assistance in a vehicle and the like.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Speed limit values may be displayed on electronic signs positioned next to the road, over a portion of the traffic lanes, or overhead each traffic lane such as on overhead gantries on road sections or on a link. In certain embodiments, the electronic signs may be displayed on a gantry extending over a portion of a link, such as a roadway. These electronic signs could be the variable speed signs (VSSs), which have become an important component of automotive cloud technology, highly assisted driving (HAD) technology and advanced driving assistance systems (ADAS). Vehicles may have high definition cameras, image sensors and/or advance radar systems that can read the displayed value on the VSS from a distance away. VSS speed values may be variable and a function of one or more of weather, traffic, time of day, day of week, construction, or other factors. For example, weather related VSS may be used on roads where fog, ice, rain, snow, or other factors may influence safety. When weather conditions deteriorate visibility to the point that hazardous conditions are impending, the operating agency may adjust (e.g., reduce) the speed limit to help minimize the likelihood of a traffic accident. Traffic congestion related VSS may be used when traffic volumes are building and congestion is likely. When volumes and/or speed exceed a predetermined threshold, an operational strategy may be deployed to handle more traffic volume at a reduced, but not stop-and-go, speed.

Apart from the VSS speed values being used to follow speed limit regulations, the VSS posted on the gantry may also be used to provide important information to be used in navigation related applications, such as the heading or direction related information of the vehicles approaching the gantry. Such heading information may be represented by a heading value of the gantry and may be stored in a map database of a mapping platform for use by vehicles using navigation and other services provided by the mapping platform. The VSS gantries may be associated with specific information stored in the map database, in the form of VSS gantry records or VSS gantry collections.

The VSS gantry records may be used to provide speed limit related recommendations. Apart from VSS gantries, there may also be static speed signs on roads that may also be used to provide speed limit related assistance in vehicle navigation. The data for static signs may also be stored in the map database. In some instances, the VSS gantry signs may be misclassified as static signs due to poor image recognition in reporting vehicles, or probe vehicles, which send data related to road signs to the map database for update. These misclassified signs need to be filtered and observations taken from road signs which are misclassified, need to be deleted from the map database for accuracy of map data and navigations related functions.

FIG. 1 illustrates a block diagram of a system for providing classification of road sign information in accordance with an example embodiment.

FIG. 1 illustrates a block diagram of a system 100 for providing classification of a road sign. The system 100 of FIG. 1 may include a user equipment 101 installed in a vehicle 103, which may be connected to a mapping platform 107 over a network 105.

The network 105 may be wired, wireless, or any combination of wired and wireless communication networks, such as cellular, Wi-Fi, internet, local area networks, or the like.

The user equipment 101 may be a navigation system and/or a sensor system, such as an advanced driver assistance system (ADAS), that may be configured to collect data related to road signs and also additionally to provide route guidance and navigation related functions to the user of the vehicle 103.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user.

The mapping platform 107 may include a map database 109, which may include node data, road segment data, link data, point of interest (POI) data, link identification information, heading value records, gantry records, road sign data, road sign permanency status data or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. The navigation device may be used to perform navigation-related functions that can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 107 may be a master geographic database configured at a server side, but in alternate embodiments, a client side-mapping platform 107 may represent a compiled navigation database that may be used in or with end user devices (e.g., user equipment 101) to provide navigation and/or map-related functions. For example, the mapping platform 107 may be used with the end user device 101 to provide an end user with navigation features. In such a case, the mapping platform 107 can be downloaded or stored on the end user device (user equipment 101) which can access the mapping platform 107 through a wireless or wired connection, over the network 105. In some example embodiments, various positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, direction of travel of vehicle, heading of vehicles and the like. The direction of travel of the vehicle may be derived based on the heading value associated with a gantry on a link, such as a roadway segment.

FIG. 2 illustrates a diagram 200 of a variable speed sign (VSS) gantry 201 in accordance with an example embodiment. The VSS gantry 201 may display the variable speed signs displaying speed limits for vehicles on the link. The link may include a non-controlled access highway or a controlled access highway. The link may include such as a roadway, a freeway, an expressway, an arterial road, a driveway, a local drive path and the like. The VSS signs may include a number of different electronic signs connected to the gantry 201 and displayed over traffic lanes of a roadway. As depicted in FIG. 2, an electronic sign is positioned over each traffic lane to display the actual speed limit value for the traffic lanes or for individual traffic lanes. In some example embodiments, a single electronic sign may be positioned over one of the traffic lanes, or on the side of the road next to the traffic lanes. In yet other embodiments, a plurality of electronic signs less than the total number of traffic lanes may be positioned over or next to a portion of the traffic lanes of the roadway. In certain embodiments, the electronic sign(s) may include variable speed limit values. The signs posted on the gantry 201 may also include additional text such as "CAR" or "TRUCK," to provide additional information regarding which vehicles the displayed speed limit value pertains to (e.g., the variable speed limit value for a car could be 60 while the speed limit value for a truck could be 50).

The gantry 201 may be associated with coordinate information such as a latitude coordinate (LatG) and a longitude coordinate (LonG). The coordinate information of the gantry 201 may be stored as a record (LatG, LonG) in the map database 109 of the mapping platform 107. The coordinate information (LatG, LonG) of the gantry 201 may be used to identify a heading information for the gantry 201, such as by using the processing component 111 of the mapping platform 107. The heading information for the gantry 201 may in turn be used to find heading information for vehicles travelling on the links in vicinity of the gantry, such as the roadway segments depicted in FIG. 2. Further, the heading value of the gantry 201 may also be used to find direction information for the vehicles travelling on the links in the vicinity of the gantry and using the mapping platform 107 for accessing navigation related applications. In some example embodiments, the heading information of the gantry may be stored in a VSS gantry file information stored in the map database 109. The VS S gantry file information may also include information related to all the gantries within a geographical region.

In some example embodiments, the geographical regions associated with the gantries may be identified such as on the basis of link PVID information stored in map database 109. Though the methods and systems disclosed herein have been described for a gantry, but it may be understood by a person of ordinary skill in the art that the methods and systems disclosed herein may also be used for other kinds of locations with only latitude and longitude, and origin and destination link identification information available.

The gantry 201 illustrated in FIG. 2 may be a VSS gantry displaying electronic signs showing speed limit values that may be variable at different instances, such as different times of day. Each road sign, such as the VSS gantry sign, may be associated with a permanency flag related to type of the road sign. For the VSS gantry signs of the gantry 201, the permanency flag must be set to temporary. However, in some instances, these VSS signs may be misclassified and their permanency flag may be set as static, leading to error in identifying the road sign correctly. The correct thing to do may be to identify these observations with road sign permanency=variable so they can be dropped using the road sign permanency flag. For example, a speed limit of 60 or 45 KPH, which is variable, may be updated as static value in the map database 109, due to misclassification. Later in the day when the VSS values change again, these variable values would be wrongly updated as the static speed limit. In some examples, these updates may be displayed on an interface of a map based navigation application, such as a map interface displaying various speed limits on display of a navigation device, such as the user equipment 101, installed in the vehicle 103.

FIG. 3 illustrates an exemplary display interface 300 of a navigation device for providing speed limit visualization according to an example embodiment. The display interface 300 includes a plurality of links, which may be visually coded based on the speed limit values to be followed on these links. In some examples, self-driving cars may utilize such a map interface to determine the appropriate speed to drive. In such cases, if the map interface is not accurately updated, it may lead to serious driving errors.

The methods and systems disclosed herein may provide accurate road sign identification and thus improved driving assistance functions, by correctly updating the map database with accurate road sign and deleting and/or dropping all data and observations related to misclassified road signs.

The map database 109 may use data related to VSS gantries, vehicle location, link information and other such records to implement the methods and systems disclosed herein for accurate classification of road signs.

FIG. 4 illustrates an exemplary record 400 stored in a map database according to an example embodiment.

FIG. 4A illustrates an exemplary table 400 illustrating a record of information stored in the map database 109. The table 400 includes multiple record entries such as record 401a (LatT,LonT) storing latitude and longitude information for a taking a road sign observation, also hereinafter referred to as a Traffic Sign Recognition (TSR) observation. Such an observation may be taken from a vehicle travelling along a link in the vicinity of a gantry, such as the VSS gantry 201 illustrated in FIG. 2.

The map database 109 may also include a record 403a, HT, which stores the TSR heading, such as the heading of the vehicle taking the observation.

The map database 109 may also include a record 405a, (LatG, LonG), which stores latitude and longitude information for a gantry.

The map database 109 may also include a record 407a, 0, which stores origin link PVID for the gantry.

The map database 109 may also include a record 409a, D, which stores destination link PVID for the gantry.

The map database 109 may also include a record 411a, F, which stores a functional class for the gantry. The functional class may be based on the roadway segment on which the gantry is located, such as FC1, FC2, FC3 and the like.

The map database 109 may also include a record 413a, g, which stores a reference notation for the gantry.

The map database 109 may also include a record 415a, $t_i$, which may be used to denote the ith traffic sign recognition observation.

The map database 109 may also include other records that may be used to implement an algorithm for classification and filtering of road signs, according to various exemplary embodiments of the invention, understood by a person of ordinary skill in the art. For example, the map database 109 may store some distance parameters, threshold parameters, distance ranges, and other similar data records that may be used to correctly and accurately filter a road sign observation.

FIGS. 5A-5B illustrate exemplary diagrams illustrating distance ranges for classification of road signs according to an example embodiment.

FIG. 5A illustrates a vehicle at a location 501a driving on a link having a gantry 503a. The gantry 503a may be a VSS gantry, such that a VSS may be posted on the gantry 503a. The location of the gantry 503a is contained in a sign file information, such as in the form of a gantry file containing a record 405a stored in the map database 109. The sign file information may also include information about all the VSS gantries located within a particular region or geographical area. For example, the sign file information may include information about all VSS gantries in a state.

The vehicle may observe a road sign, such as a VSS posted on the gantry, and may record a road sign observation. In some examples, the road sign observation may be recorded using one or more sensors installed on the vehicle. For example, the vehicle may record the road sign using a camera placed on the vehicle. At the time of taking the road sign observation, the vehicle may be a location 501a which is within a long distance threshold. Further, at the time of taking the observation, the one or more sensors on the vehicle may be able to record the sign value, as well as the vehicle location and heading.

In some example embodiments, a heading of a line of sight, also known as heading of sight from the vehicle location 501a to the VSS gantry 503a may be identified based on the vectors of vehicle heading and VSS gantry heading.

The distance for taking the road sign observation may be variable, for example, on highways where the vehicle is usually running in high speed the distance range of taking the road sign observation may be longer than 30 meters distance threshold. While on other types of links, the distance range may be smaller.

In some example embodiments the type of link may be used to set the long-distance threshold. The long-distance threshold may be lesser on a non-controlled access highway and larger on a controlled access highway. For example, the long-distance threshold may be around 120-180 meters on controlled-access highway and be around 50-100 meters on non-controlled-access highway to cover the GPS errors.

There could also be a tradeoff involved in setting the long distance threshold. For example, larger threshold may wrongly filter out more signs when the road is a curvature. Further, larger threshold may make the problems complex if there is split in the upstream links. Additionally, if upstream link has different FC from the current link, further judgment may be needed.

Once the long-distance threshold is established, the vehicle location and heading is identified, the road sign observation may be filtered based on proximity of the vehicle location to the VS S gantry.

The road sign observation to be filtered may be identified based on some criteria. Such as if the vehicle heading and VSS gantry heading are similar. That is to say, a difference between the vehicle heading, and thus, the road sign observation heading, and the VSS gantry heading is negligible.

Further, for the road sign observations that qualify these criteria, the VSS gantry location and the vehicle location can form a vector. Within a long-distance threshold, further those road sign observations are filtered whose heading difference between the vector (blue arrow in the image above) and TSR heading (red arrow in the image above) is smaller than a heading difference threshold.

In some example embodiments, the long-distance threshold can be more than 100 meters.

In some example embodiments, the heading difference threshold may be calculated based on difference between the heading of the vehicle and the heading of sight from the vehicle location 501a to the VSS gantry 503a.

In some example embodiments, the setting of heading difference threshold may consider the effect of distance between the vehicle location at the time of road sign observation and gantry: if the distance between the vehicle location at the time of road sign observation and gantry is larger, the heading difference threshold between the vector and the vehicle location at the time of road sign observation should be smaller; if the distance is smaller, the case may be the opposite.

In some example embodiments, both the distance and heading difference threshold may be calibrated by the real-time field data observations.

The road sign observations may further be filtered using a second filtering critera, as illustrated in FIG. 5B.

The second filtering may be used when the vehicle speed is significantly lesser than the speed limit value identified based on the road sign observation. In such a scenario, the slow-speed vehicle location may be very close the gantry due to the GPS errors of both vehicle and gantry locations.

In some example embodiments, a short-distance threshold may be used to filter the road sign observations, without considering the heading of the vehicle.

In some example embodiments, the road sign observations may be filtered on the basis of heading and short-distance threshold. For example, the road sign observations to be removed may have a similar heading as the gantry.

In some example embodiments, all the road sign observations taken within the short distance threshold may be filtered and/or removed.

The various parameters used for filtering the road sign observations may be calculated as discussed below.

The original gantry file does not have the heading information. For each gantry, its heading may be calculated according to the original and destination Link PVID by the gantry map-matching and heading generation method. The generated gantry heading may be noted as HG.

Further, the heading difference threshold between the vehicle heading and gantry may can be set to be 50 degrees.

First Filtering

Given a gantry g and a set of road sign observations $T=\{t_i\}$, for each $t_i$:

The heading of vectors HV formed by road sign observations and gantry location may be calculated as:

$$x = LonG - LonT_i$$

$$y = LatG - LatT_i$$

$$HV = \begin{cases} 180 \cdot \arccos\left(\frac{y}{\sqrt{x^2+y^2}}\right) & \text{if } x \geq 0 \\ 360 - 180 \cdot \arccos\left(\frac{y}{\sqrt{x^2+y^2}}\right) & \text{if } x < 0 \end{cases}$$

Further the Euclidean distance, D, between the road sign observation location and gantry location may be identified as $$D=\sqrt{x^2+y^2}$$

The distance D between road sign observation location and gantry can be as large as 180 m, thus the distance threshold $d_1$ may be set to be 180 m when functional class is 1 and 50 m if the functional class is larger than 1.

The heading difference between vector heading HV and road sign observation heading HT can be either as large as 80 degrees or as small as 20 degrees. Usually, for a TSR, its heading difference threshold $h_i$ has a negative correlation with its distance to the gantry:

$$\frac{h_i - 80}{20 - 80} = \frac{D_i - 0.00015}{0.0018 - 0.00015} \text{ if } F = 1$$

$$\frac{h_i - 80}{20 - 80} = \frac{D_i - 0.00015}{0.0005 - 0.00015} \text{ if } F > 1$$

Apply the first filtering by heading and long-distance threshold: obtain the qualified TSR $\{t_j\}$:

$$\{t_j\}=\{t_i|D \leq d_1 \&(|HV-HG| \leq h_i||HV-HG| \geq 360-h_i)$$

$$\&(|HG-HT| \leq 50||HG-HT| \geq 360-50)\}$$

The $\{t_j\}$ are qualified for the first filtering and should be removed.

Second Filtering

The short-distance threshold may not be very large and filtering these road sign observations may not affect the road sign observations in the parallel roads or the road sign observations on the highway in the opposite direction. Thus, we do not need to compare the headings between vector (formed by vehicle location at the time of road sign observation and gantry. The short-distance threshold $d_2$ can be set as 15 meters because lane width of highway is usually 3.5 to 3.75 meters and there are usually 2-4 lanes in one link.

Applying the second filtering by short-distance threshold: obtain the qualified TSR $\{t_k\}$:

$$\{t_k\}=\{t_i|D \leq d_2 \&(|HG-HT| \leq 50||HG-HT| \geq 360-50)\}$$

Thus, these qualified road sign observations, TSR, may be filtered or dropped from the map database 109. In some example embodiments, the filtering may be performed on the basis of one or more methods for filtering road signs discussed herein.

FIG. 6 illustrates a flow diagram of a method 600 for filtering of road signs according to an example embodiment.

The method 600 may include, at 601, receiving a road sign observation information from a vehicle. The vehicle may be travelling on a link such as on a controlled access highway or a non-controlled access highway. In some example embodiments, the road sign may be a traffic sign to provide information related to one or more of a speed limit, a geographical location, a direction guidance, a route identification information and the like. In some example embodiments, the road sign may be a different sign showing other information apart from traffic or speed or route related information. For example, the road sign may be a banner, an advertisement, a quotation, a picture, a campaign poster, and the like. The road sign observation information may include observation of the road sign based on one or more sensors provided on the vehicle. The one or more sensors may include such as a camera, a location sensor, a motion sensor, a LIDAR sensor and the like. The method 600 may further include, at 603, retrieving a VSS gantry file information, also interchangeably referred to as sign file information, from a database. The VSS gantry file information may include information about a plurality of VSS gantries in a geographical region. This information may include such as location coordinates of the VSS gantries in the geographical region and their link PVIDs. The database may be such as the map database 109 of the mapping platform 107. The sign file information retrieved from the map database 109 may be used to identify a heading for the VSS gantry. The heading may be used by the method 600, at 605, for filtering the road sign observation based on a distance threshold of the vehicle to a gantry in a geographical region.

The distance threshold may be one of a long-distance threshold or a short-distance threshold. The distance of the vehicle from the gantry may be compared against the long-distance threshold and/or the short-distance threshold for filtering the road sign observation information.

In some example embodiments, a vector of a vehicle location heading and a line of sight of vehicle location to the VSS gantry may also be used to filter the road sign observation information.

The consideration of heading information for filtering the road sign observation information may be illustrated by the method of FIG. 7 discussed below.

FIG. 7 illustrates a flow diagram of another method 700 for filtering of road signs according to an example embodiment.

The method 700 may include, at 701, receiving a road sign observation information from a vehicle. The road sign observation information may relate to one or more road signs or traffic signs observed on a link on which the vehicle may be travelling. In some example embodiments, the road sign observation information may be received by a map database, such as the map database 109 of the mapping platform 107 illustrated in FIG. 1.

The method 700 may further include, at 703, receiving a sign file information. The sign file information may contain location coordinates for VSS gantries in a geographical region. In some example embodiments, the sign file information may also contain other records such as the exemplary records 401a-415a illustrated in the table 400 of FIG. 4. The location coordinates of the VSS gantries may be used to calculate heading value for a VSS gantry of interest, such as a VSS gantry at a specified distance from the vehicle within a geographical region.

The method 700 may further include, at 705, identifying a heading of sight from a vehicle location to a VSS gantry. The vehicle location may be the location of the vehicle at the time of taking the road sign observation and the gantry may be a VSS gantry within a specified distance threshold from the vehicle location. The location of the vehicle and the location of the gantry may be used to form a straight line, that is the line of sight, as illustrated in FIG. 5A. The heading value of this line of sight may be the heading of sight from the vehicle location to the VSS gantry. Once, the heading of sight has been identified, the method 700 may include, at 707, identifying a distance range for road sign observation information detection. In some example embodiments, the distance range may be the Euclidean distance of the vehicle location from the VSS gantry.

Further, the method 700 may include, at 709, calculating a difference between heading of the vehicle and heading of sight of the vehicle. Further, the method 700 may include, at 711 filtering the road sign observation information based on a first filtering criteria or a second filtering criteria.

In some example embodiments, the first filtering criteria may include checking whether the distance range of the vehicle for road sign information detection is within a long distance threshold and that the difference between the heading information of the vehicle and the heading of sight from the vehicle to the gantry is within a heading difference threshold. Once it is checked that both the conditions are met, the road sign observation may be filtered.

In some example embodiments, the second filtering criteria may include checking that the distance range for road sign observation information detection is within a short-distance threshold. Once it is determined that the distance range for road sign observation information detection is within the short-distance threshold, the road sign observation may be filtered.

In some example embodiments, the first filtering criteria may be used without the second filtering criteria.

In some example embodiments, the first filtering criteria may be used in conjunction with the second filtering criteria.

In some example embodiments, the first filtering criteria may include a long-distance threshold and the heading difference and the second filtering criteria may include a short-distance threshold.

In an example embodiment, an apparatus for performing the methods 600 & 700 of FIGS. 6 and 7 above may comprise a processor (e.g. the processor 111) configured to perform some or each of the operations of the methods of FIGS. 6 and 7 described previously. The processor may, for example, be configured to perform the operations (601-605) and (701-711) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-605) and (701-711) may comprise, for example, the processor 111 which may be implemented in the user equipment 101 and/or a device or circuit for executing instructions or executing an algorithm for processing information as described above.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method to filter a road sign observation in a database comprising:
   receiving the road sign observation information from a vehicle on a link, wherein the road sign information includes at least a location of the vehicle;
   retrieving, from the database, a sign file information wherein the sign file information includes location of a plurality of VSS gantries in a geographical region; and
   filtering the road sign observation information if the location of the vehicle is within a predetermined distance threshold from at least one VSS gantry from the plurality of VSS gantries in the geographical region.

2. The method of claim 1, wherein filtering the road sign observation information comprises deleting the road sign observation information from the database.

3. The method of claim 1 further comprises:
   identifying a heading information of the vehicle on the link;
   identifying a heading information of the at least one VSS gantry;
   identifying a heading of sight from the vehicle to the at least one VSS gantry based on the heading information of the vehicle and the heading information of the at least one VSS gantry;
   identifying a distance range for road sign observation information detection;
   calculating, by a processor, a difference between heading information of the vehicle and the heading of sight from the vehicle to the at least one VSS gantry; and
   filtering the road sign observation information based on the difference between the heading information of the vehicle and the heading of sight from the vehicle to the at least one VSS gantry and the distance range for road sign observation information detection.

4. The method of claim 3, wherein filtering the road sign observation information further comprises deleting the road sign observation information from the database if the distance range for the road sign observation information detection is within a long-distance threshold and without a short-distance threshold, and the difference between the heading information of the vehicle and the heading of sight from the vehicle to the at least one VSS gantry is less than the heading difference threshold.

5. The method of claim 4, wherein filtering the road sign observation information further comprises deleting the road sign observation information from the database if the distance range for the road sign observation information detection is within a short-distance threshold.

6. The method of claim 4, wherein filtering the road sign observation information further comprises deleting the road sign observation information from the database if the distance range for the road sign observation information detection is within a short-distance threshold and the heading information of the at least one VSS gantry is similar to the heading information of the vehicle.

7. The method of claim 3, wherein the heading difference threshold can be changed based on the distance range for road sign observation detection such that the heading difference threshold is increased with increase in the distance for road sign observation detection.

8. The method of claim 3, wherein the long-distance threshold is based on the type of link, wherein the link can include at least one of a controlled-access highway and a non-controlled access highway, wherein the long-distance threshold is less on the non-controlled access highway than the long-distance threshold on the controlled access highway.

9. A mapping platform comprising:
at least one processor; and
at least one memory including computer program code for one or more programs,
the at least one memory and the computer program code configured to, with the at least one processor, cause the mapping platform to perform at least the following:
receive a road sign observation information from a vehicle, wherein the road sign observation information includes a heading information of the vehicle;
receive a sign file information, wherein the sign file information is used to identify a heading information for a gantry;
identify a heading of sight from the vehicle to the gantry based on the heading information of the vehicle and the heading information of the gantry;
identify a distance range for road sign observation information detection;
calculate a difference between the heading information of the vehicle and the heading of sight from the vehicle to the gantry; and
filter the road sign observation information based on a first filtering criteria or a second filtering criteria, wherein the first filtering criteria includes at least that the distance range for road sign observation information detection is within a long distance threshold and the second filtering criteria includes at least that the distance range for road sign observation information detection is within a short-distance threshold.

10. The mapping platform of claim 9, wherein the first filtering criteria further includes a difference between the heading information of the vehicle and the heading of sight from the vehicle to the gantry.

11. The mapping platform of claim 9, wherein the short-distance threshold is less than the long-distance threshold.

12. The mapping platform of claim 9, wherein the gantry is a variable speed sign gantry.

13. The mapping platform of claim 9, wherein to filter the road sign observation information, the mapping platform is further caused to delete the road sign observation information from the mapping platform if the distance range for the road sign observation information detection is within the long-distance threshold and without the short-distance threshold, and the difference between the heading information of the vehicle and the heading of sight from the vehicle to gantry is less than a heading difference threshold.

14. The mapping platform of claim 9, wherein to filter the road sign observation information, the mapping platform is further caused to delete the road sign observation information if the distance range for the road sign observation information detection is within the short-distance threshold.

15. The mapping platform of claim 9, wherein to filter the road sign observation information, the mapping platform is further caused to delete the road sign observation information if the distance range for the road sign observation information detection is within the short-distance threshold and the heading information of the gantry is similar to the heading information of the vehicle.

16. A computer program product comprising at least one non-transitory computer-readable storage medium having computer-executable program code instructions stored therein, the computer-executable program code instructions comprising program code instructions for:
receiving a road sign observation information from a vehicle, wherein the road sign observation information includes a heading information of the vehicle;
receiving a sign file information, wherein the sign file information is used to identify a heading information for a gantry;
identifying a heading of sight from the vehicle to the gantry based on the heading information of the vehicle and the heading information of the gantry;
identifying a distance range for road sign observation information detection;
calculating a difference between the heading information of the vehicle and the heading of sight from the vehicle to the gantry; and
filtering the road sign observation information based on a first filtering criteria or a second filtering criteria, wherein the first filtering criteria includes at least that the distance range for road sign observation information detection is within a long distance threshold and the second filtering criteria includes at least that the distance range for road sign observation information detection is within a short-distance threshold.

17. The computer program product of claim 16, wherein filtering the road sign observation information further comprises deleting the road sign observation information from a database if the distance range for the road sign observation information detection is within the long-distance threshold and without the short-distance threshold, and the difference between the heading information of the vehicle and the heading of sight from the vehicle to gantry is less than a heading difference threshold.

18. The computer program product of claim 16, wherein filtering the road sign observation information further comprises deleting the road sign observation information from a database if the distance range for the road sign observation information detection is within the short-distance threshold.

19. The computer program product of claim 16, wherein filtering the road sign observation information further comprises deleting the road sign observation information if the distance range for the road sign observation information detection is within the short-distance threshold and the heading information of the gantry is similar to the heading information of the vehicle.

20. The computer program product of claim 16, wherein the gantry is a variable speed sign gantry.

* * * * *